(12) United States Patent
Soffer (10) Patent No.: US 8,922,372 B2
(45) Date of Patent: Dec. 30, 2014

(54) SECURE PERIPHERAL CONNECTING DEVICE

(75) Inventor: Aviv Soffer, Caesarea (IL)

(73) Assignee: High Sec Labs Ltd, Yokneam Industrial Zone (IL)

( * ) Notice: Subject to any disclaimer, the term of this patent is extended or adjusted under 35 U.S.C. 154(b) by 14 days.

(21) Appl. No.: 13/548,340

(22) Filed: Jul. 13, 2012

(65) Prior Publication Data

US 2014/0015673 A1  Jan. 16, 2014

(51) Int. Cl.
*G08B 13/14* (2006.01)

(52) U.S. Cl.
USPC .............. 340/568.1; 340/693.1; 340/825.23

(58) Field of Classification Search
USPC ........ 340/568.1, 568.2, 568.3, 552, 561, 571, 340/572.1, 573.1, 641, 693.1, 825.23, 340/815.44–815.49, 393.3
See application file for complete search history.

(56) References Cited

U.S. PATENT DOCUMENTS

| | | | | |
|---|---|---|---|---|
| 4,942,605 A * | 7/1990 | McClain | ...... | 379/424 |
| 5,822,406 A * | 10/1998 | Brown | ...... | 379/88.07 |
| 5,900,759 A * | 5/1999 | Tam | ...... | 327/201 |
| 6,169,762 B1 * | 1/2001 | Embree et al. | ...... | 375/220 |
| 6,725,200 B1 * | 4/2004 | Rost | ...... | 705/3 |
| 8,401,521 B2 * | 3/2013 | Bennett et al. | ...... | 455/411 |
| 2007/0198856 A1 * | 8/2007 | Lee et al. | ...... | 713/190 |
| 2008/0117029 A1 * | 5/2008 | Dohrmann et al. | ...... | 340/286.02 |
| 2010/0156653 A1 * | 6/2010 | Chaudhari et al. | ...... | 340/686.1 |
| 2011/0208963 A1 * | 8/2011 | Soffer | ...... | 713/168 |

* cited by examiner

*Primary Examiner* — Daniel Previl (74) *Attorney, Agent, or Firm* — Browdy and Neimark, PLLC (57) ABSTRACT

A secure peripheral device, coupled to a computer, capable of enabling a user to use a peripheral device such as a microphone, speakers, headset or video camera when the device is in operational state, while giving to the user a clear visual indication that the device is enabled. The device simultaneously disables the user peripheral device; and turns off the visual indication when the secure peripheral device is in secure state. The operational state is activated by the user by pressing a momentary push-button switch. A timer resets the device to a secure state after a short preset time. The device has anti-tempering functionality and becomes permanently disabled if tempered with. Optionally the device is coupled to the computer via a USB port that powers it.

25 Claims, 7 Drawing Sheets

SECURE PERIPHERAL CONNECTING DEVICE

FIELD OF THE INVENTION

The present invention relates to a device and a method that enables a computer user to securely use peripheral devices such as desktop microphone, headset and video camera without being exposed to the risk of remote eavesdropping.

BACKGROUND OF THE INVENTION

The presence of microphones and video cameras in computerized products such as desktop computers, laptop computers, PDAs, tablets and mobile phones creates an information security and privacy protection challenge today. As computers connected to public networks and to the internet can be easily hacked and controlled remotely, these products having internal or external microphones and cameras are at risk of becoming an eavesdropping bug. Attacker can install a malicious code on the product that will activate a microphone in such way that it will pick up surrounding conversation, compress the audio data and stream it over the internet to the interested attacker. Then the attacker reconstructs the audio signal, enhance it if needed and analyze it to recover valuable information. Such method can operate while the user is completely unaware and it can even run undetectable by anti-virus and intrusion detection programs through the use of Zero Day Vulnerabilities. Zero Day Vulnerabilities are non-publicized new security vulnerabilities that can be used by attackers to modify or control product functionality.

One of the most common methods used to hack computer microphone remotely is through the use of RAT. RAT is an acronym for Remote Access Trojan. A RAT might have a functional use, but it is typically used to describe malicious code that is installed without the user's knowledge with the intent of monitoring the computer, logging keystrokes, capturing passwords and otherwise assuming control of the computer from a remote location. Common RATs such as Sub7 have the functionality of enabling computer microphone or video camera remotely and streaming the data back to the attacker.

Prior-art computer microphones and headsets are prone to covert eavesdropping as they are typically not equipped with efficient means of disabling microphone activity when not used by the user. Even when On-Off switch is installed between the microphone and the audio CODEC circuitry, such switch is not efficient as users tend to leave it on continuously.

Computer microphones and headset devices are also lacking the clear user indications when microphone is active and therefore users are unaware when microphone is activated by software means.

Another disadvantage of prior-art computer microphones and headsets is the lack of anti-tampering means that will prevent physical attack on the device in attempt to bypass switches or other internal security means.

To overcome these disadvantages, many high-security organizations are instructing their workforce to remove all microphones, headsets and video cameras from their desktop computers. In addition to that, many organizations are physically removing microphones and video cameras from the laptop computers that they are purchasing and using.

U.S. Pat. No. 4,942,605 titled "Security Handset"; discloses a security handset. This handset is designed to prevent eavesdropping of telephone handsets while handset is on-hook. This prior-art device is not suitable for use in today's environment as computer headsets do not have on-hook/off-hook states. Headsets and microphones are not stored or hanged while not in active use.

SUMMARY OF THE EMBODIMENTS

In view of the security risks associated with microphones, headsets and video cameras connected to computers, and in view of the shortcoming of prior art microphones, headsets and video cameras connected to computers, there is a need for a secure peripheral device that at least will:
1. Provide efficient and secure switching of the coupled user peripheral device activity, controllable only by the user and completely isolated from computer control;
2. Prevent inadvertent long periods of active user peripheral device by user neglect or lack of discipline; and
3. Provide clear user visual indications when user peripheral device is active.

The present invention provides a device that enables a computer user to securely use peripheral devices such as audio microphones or video cameras without being exposed to the risk of remote eavesdropping. Another goal of the present invention is to enable secure sharing of such devices between different computers.

The secure peripheral device embodiments of the current invention isolate the activation—deactivation inputs from the connected computer in such way that prevent hacked computer from enabling its microphone, headset or video camera while the user is unaware.

One aspect of the current invention is to provide a secure peripheral connecting device comprising: at least one computer interface, capable of interfacing the device with a coupled computer; at least one peripheral device interface, capable of interfacing the device with a user peripheral device; a user switch; an indicator element; switches; and a controller, wherein: user activation of said user switch is capable of causing said controller to activate said switches for setting the device in an operational state by: enabling transfer of data to and from said user peripheral device and said coupled computer; and turning on said indicator element, and wherein said controller is capable of automatically activating said switches for setting the device in a secured state by:
disabling transfer of data to and from said user peripheral device and said coupled computer; and changing the state of said indicator element.

In some exemplary embodiments the operational state is maintained as long as said user switch is activated, and the device returns to said secure state after said user switch is released.

In some exemplary embodiments the controller is capable of maintaining the device in said operational state for a predefined time interval after said user switch was activated.

In some exemplary embodiments the switches are further comprising a switch capable of disabling power to said coupled peripheral device when the device is in said secure state.

In some exemplary embodiments the device is further comprising an active anti-tampering function.

In some exemplary embodiments, when the device is in said operational state: a short activation of said user switch returns the device to said secure state, and a long activation of said user switch extend the time interval of said operational state.

In some exemplary embodiments the predefined time interval is adjustable by the user.

In some exemplary embodiments the predefined time interval is adjustable by the user using at least one of: PC programming, keyboard entries, DIP switches, at least one trimmer, a rotary encoder, and configuration resistors.

In some exemplary embodiments, while the device is in said secure state, said switches are capable of coupling said peripheral device to a controller for prequalification of said peripheral device.

In some exemplary embodiments the device is further comprising: a selector; USB multiplexers; a plurality of computer interfaces USB plugs, each capable of interfacing the device with a different coupled computer, wherein said selector is capable of controlling said USB multiplexers to couple a selected coupled computer to said peripheral device.

In some exemplary embodiments the device further comprising a USB hub, capable of monitoring the status said peripheral device interface.

In some exemplary embodiments the USB hub is capable of detecting and reporting to the microcontroller events related to said status of said device interface selected from the group consisting of: peripheral device connection; peripheral device reset; and peripheral device disconnection, and wherein said microcontroller, is capable of controlling said USB multiplexers for coupling said peripheral device to a controller for prequalification of said peripheral device when said an event related to said status of said device interface was detected.

Another aspect of the current invention is to provide a secure peripheral connecting device comprising: at least one computer interface, capable of interfacing the device with a coupled computer; at least one USB Audio CODEC; at least one analog interfaces, capable of interfacing the device with a user audio peripheral device; a user switch; an indicator element; switches; and a controller, wherein: user activation of said user switch is capable of causing said controller to activate said switches for setting the device in an operational state by: enabling transfer of data to and from said user peripheral device and said coupled computer; and turning on said indicator element, and wherein said controller is capable of automatically activating said switches for setting the device in a secured state by: disabling transfer of data to and from said user peripheral device and said coupled computer; and changing the state of said indicator element.

In some exemplary embodiments the operational state is maintained as long as said user switch is activated, and the device returns to said secure state after said user In some exemplary embodiments the controller is capable of maintaining the device in said operational state for a predefined time interval after said user switch was activated.

In some exemplary embodiments the switches are further comprising a switch capable of disabling power to said coupled peripheral device when the device is in said secure state.

In some exemplary embodiments the device is further comprising an active anti-tampering function.

In some exemplary embodiments, when the device is in said operational state: a short activation of said user switch returns the device to said secure state, and a long activation of said user switch extend the time interval of said operational state.

In some exemplary embodiments the predefined time interval is adjustable by the user.

In some exemplary embodiments the predefined time interval is adjustable by the user using at least one of: PC programming, keyboard entries, DIP switches, at least one trimmer, a rotary encoder, and configuration resistors.

In some exemplary embodiments the device is further comprising: a selector;
USB multiplexers; a plurality of computer interfaces USB plugs, each capable of interfacing the device with a different coupled computer, wherein said selector is capable of controlling said USB multiplexers to couple a selected coupled computer to said peripheral device.

In some exemplary embodiments, wherein when the secure state, said switch it In some exemplary embodiments the device is comprising a mute switch, controllable by said controller and connected to MIC_MUTE discrete input of said USB audio CODEC, wherein information indicative of mute status of said USB audio CODEC can be passed to an application running at said coupled computer.

Yet another aspect of the current invention is to provide a secure peripheral connecting device comprising: at least one computer interface capable of interfacing the device with a coupled computer, wherein said computer interface comprises at least one analog audio connector; at least one peripheral device interface, capable of interfacing the device with a user peripheral device, wherein said peripheral device interface comprises at least one analog audio connector; a user switch; an indicator element; switches; and a controller, wherein: user activation of said user switch is capable of causing said controller to activate said switches for setting the device in an operational state by: enabling transfer signals to and from said user peripheral device and said coupled computer; and turning on said indicator element, and wherein said controller is capable of automatically activating said switches for setting the device in a secured state by: disabling transfer of signals to and from said user peripheral device and said coupled computer; and changing the state of said indicator element.

In some exemplary embodiments the device is further comprising a buffer amplifier, capable of transmitting analog signal only in the direction to said peripheral device.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF THE DRAWINGS

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand alone programs, may be incorporated as subroutines in an operating system, may be functions in an installed software package, and the like.

Figure 1:
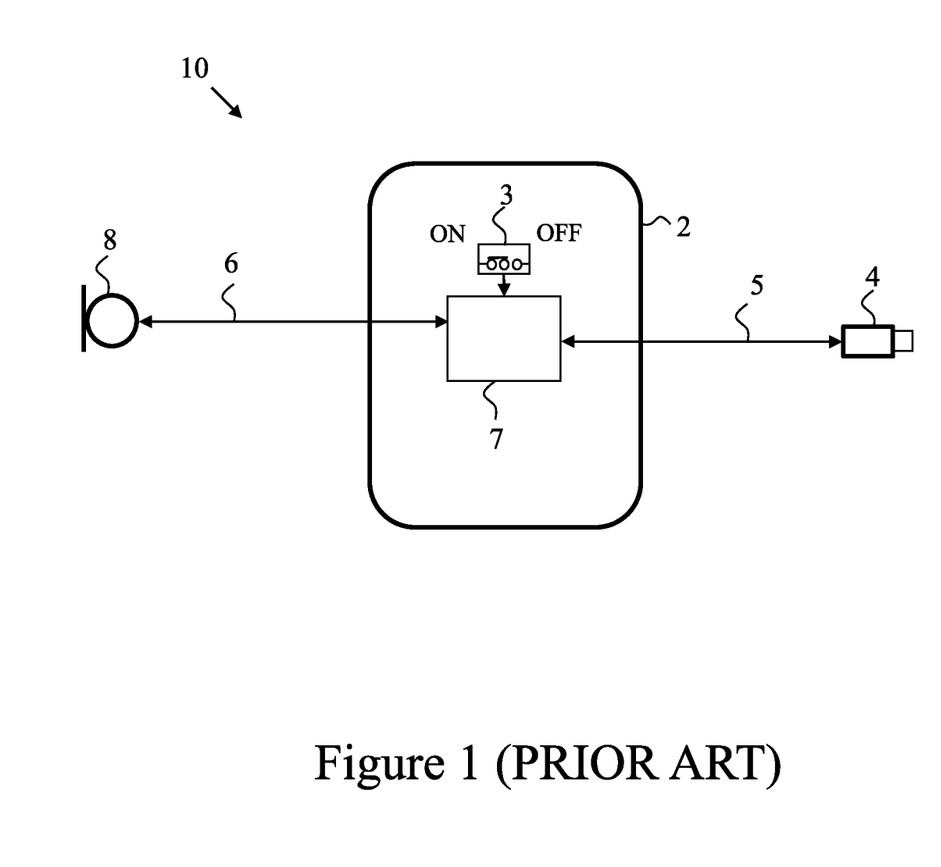
FIG. 1 illustrates a high-level block-diagram of a prior-art computer desktop microphone peripheral device having internal USB audio CODEC and USB interface with the computer.

FIG. 1 illustrates a block diagram presentation of a prior-art computer desktop microphone device implementation 10 having a USB (Universal Serial Bus) computer interface cable 5 coupled to the computer through USB Type-A plug 4. Electrets microphone capsule 8 installed on a flexible goose neck or plastic boom which is a hollow tube used to route microphone cable 6. Microphone cable 6 is coupled to the USB Audio CODEC chip 7 where Analog to Digital conversion is made. A single pole switch 3 to enable user On-Off control of the microphone activity typically through the switching of USB CODEC line called MIC_MUTE. Once this line is asserted the USB CODEC mutes the microphone output to the coupled computer.

Typical example for USB Audio CODEC chip is PCM2906B—Texas Instruments' single-chip stereo audio CODEC with USB interface. Many silicon vendors are offering similar solutions with different functions and audio quality levels.

This computer desktop microphone is good example for a user peripheral device having severe security vulnerabilities. The on-off switch 3 may be left on for long period of time by the user. It also may be turned on by modified device driver without user action or awareness. Since it lacks some critical security functions as mentioned above it is regarded as unsecure device. Its use in a secure environment—where confidential discussions are taking place is risky.

Figure 2:
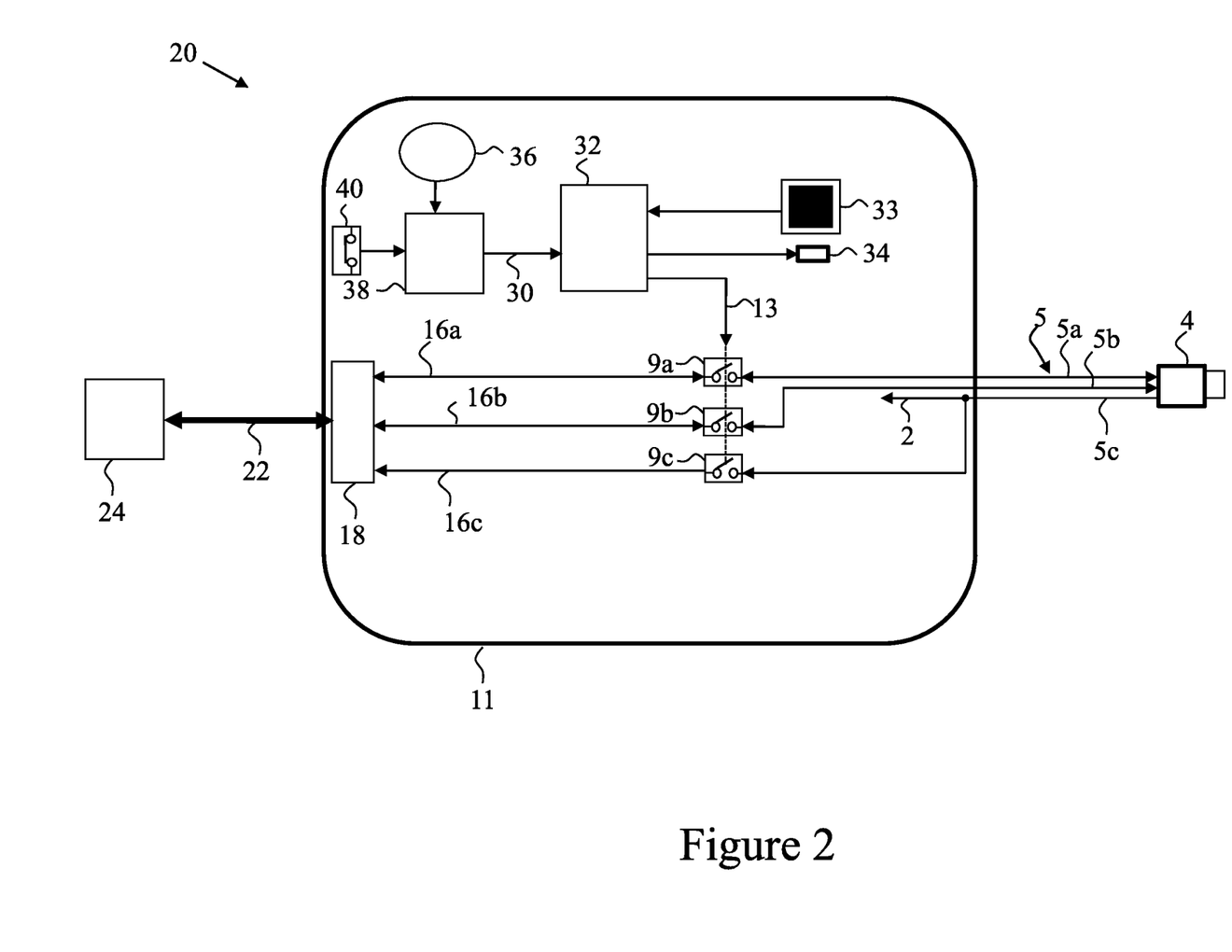
FIG. 2 illustrates a high-level block-diagram of an exemplary method and embodiment of the present invention having an illuminated push-button and timer.

FIG. 2 illustrates a high-level block diagram of a secure peripheral device 20 according to an exemplary embodiment of the current invention. Secure peripheral device 20 is having a USB interface cable 5, coupled with the coupled computer (not shown here). USB interface includes the two bi-directional data lines 5a and 5b and the 5V power line 5c (ground line not shown here). The two bi-directional data lines 5a and 5b are coupled to a switch element 9a and 9b respectively to enable isolation of the connected USB device 24 from the coupled computer when device is in secure state. Additional optional power switch 9c may be added to switch the USB +5V power line 5c supply to the connected user peripheral device 24 when device is in secure state. When the operates a user switch 33, for example when user pushes the push-button 33 it triggers a timer in microcontroller 32 that causes the following events through line 13:
  a. Indicator element 34 is operated to indicate active mode of the device. For example, Push-button blue LEDs are illuminating in element 34 that is located inside or near push-button 33;
  b. USB data line switches 9a and 9b are closing coupling lines 5a to 16a and 5b to 16b to enable computer to user peripheral device 24 communications; and:
  c. Optional power switch 9c couples the USB +5V power line 5c to line 16c that powers the user peripheral device 24 that is coupled through USB cable 22 and USB jack 18.

At the end of the pre-set time, a timer in microcontroller 32 that causes the following events through line 13:
  a. Push-button blue LEDs in element 34 that is located inside or near push-button 33 are turned off;
  b. USB data line switches 9a and 9b are opened decoupling lines 5a to 16a and 5b to 16b to disenable computer to user peripheral device 24 communications; and:
  c. Optional power switch 9c opens, decoupling the USB +5V power line 5c from line 16c that powers the user peripheral device 24 that is coupled through USB cable 22 and USB jack 18.

It should be noted that elements 9x can be a relay, solid state matrix, multiplexer or any other circuitry that is capable of isolating the communication protocol in use (USB in this example). It also should be noted that microcontroller 32 may be replaced here and in the next figures with discrete or integrated electronic circuitry that performs the required timing logic without running a code. For example it is possible to design such function using industry standard NE555 timer integrated circuit. It is also possible to implement such circuitry with FPGA (Field Programmable Gates Array) or PLD (Programmable Logic Device).

Optionally, in order to further enhance the device 20 usability, one or few of the following operation modes may be implemented:

When the device is in secure state and the push-button is pressed, the device switches to operational state. The preprogrammed time interval is set to 20 to 60 seconds during device production or through field programming means such as DIP switches or USB programming by computer application.

When the device 20 is in operational state, if the user presses the push-button 33 momentarily (short press=less than 2.5 seconds), then the device will change state to secure immediately. This function is called mute function.

If the user presses long press on the push-button 33 (more than 2.5 seconds), the time interval timer will restart and extend the operational state.

Once the preprogrammed time interval reached 75% of the time, the blue LEDs in element 34 starts to blink or change illumination color or intensity to indicate that the device time interval is about to expire.

Another operating mode possible with the device 20 of the current invention is Push-To-Talk mode. In this mode, when the user presses the push-button 33, the device is switching to operating state. Once the push-button 33 is being released, the device is switching into secure state. This mode of operation may be useful for audio (speech) applications operating in half-duplex mode.

All device circuitry is normally powered by the connected computer through the USB power line 5c and line 2.

In an embodiment of the present invention the secure peripheral device 20 is optionally further equipped with active anti-tampering function 38. This function uses low power microcontroller or discrete components to sense mechanical intrusion attempt through sensor such as switch 40 that is coupled to the device enclosure 11. When switch 40 is interrupted, the anti-tampering function 38 senses this transition and triggers a chain of events through line 30 that cause the following effects:
  a. Device is disabled permanently—it cannot be activated anymore.
  b. Device provides clear user indications of the tampered state. These indications typically include blinking action of the red lighted LEDs 34 inside the push-button switch 33.

During normal operation, security microcontroller 32 and anti-tampering function 38 are powered by coupled computer through the USB interface supply 2. For drawing clarity these power lines were omitted from the drawings.

Coin battery or super-capacitor 36 provides backup power for the anti-tampering function 38 and sensor 40 to enable detection even when the device is unpowered (for example during shipment). Additional means such as tamper evident labels may be used to provide visual indications of the tampering attempt.

It should be noted that the active anti-tampering function may be critical to assure that product was not tampered with, modified, or extra circuitry added to it to provide a covert activation of peripheral device 24, or to add other covert monitoring such as audio channel with remote attacker.

In some embodiments the visual indicator 34 is a dual-color indicator, for example a red/green LED. Red light may indicate active device while green light may indicate that the device is in a secured state. In some embodiments, the visual indicator 34 is used to indicate tampering state by illuminating in red color.

Figure 3:
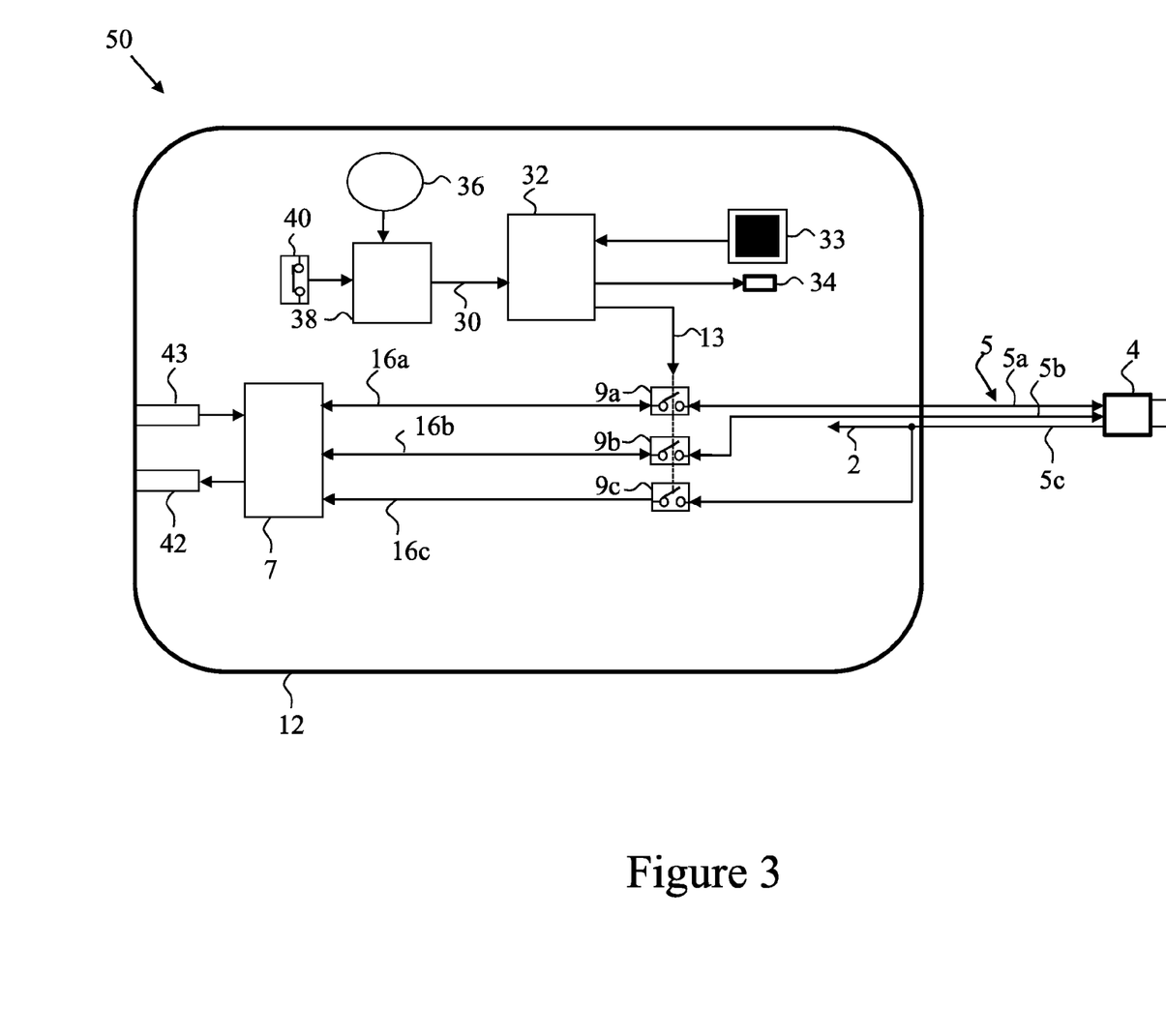
FIG. 3 illustrates a high-level block-diagram of an exemplary method and embodiment of the present invention having an internal audio CODEC function and switched USB.

In some embodiments, security microcontroller 32 monitors the timing of activation of push-button 33 and prevents the activation of switches 9x if push-button 33 is jammed intentionally or unintentionally, FIG. 3 illustrates a high-level block diagram of another secure peripheral device 50 according to an exemplary embodiment of the current invention having an integrated user peripheral device function such as a USB audio codec 7.

This embodiment of the present invention is similar to the embodiment described in FIG. 2 above with the additional USB audio CODEC 7 that is permanently couple to switches 9x. Audio input jack 43 is microphone or line-in input to enable connection of analog audio sources. Audio output jack 42 is a stereo headphones out or line out to enable connection of user headset or speakers. Audio jacks 42 and 43 are positioned in device enclosure 12 to enable user access through exposed holes.

Operation of elements seen in FIG. 2 is the same as disclosed in the explanation of that figure. Thus, audio devices connected to jacks 42 and 43 are activated to a preset time for each depression of push-button 33. Additionally, the user may have clear visual indication as to the state of the device such as: "safe"; "connected"; and "device tempered with". Such secure peripheral device 50 of the current invention may be used to secure existing (prior-art) analog audio products and therefore to extend their safe use.

Figure 4:
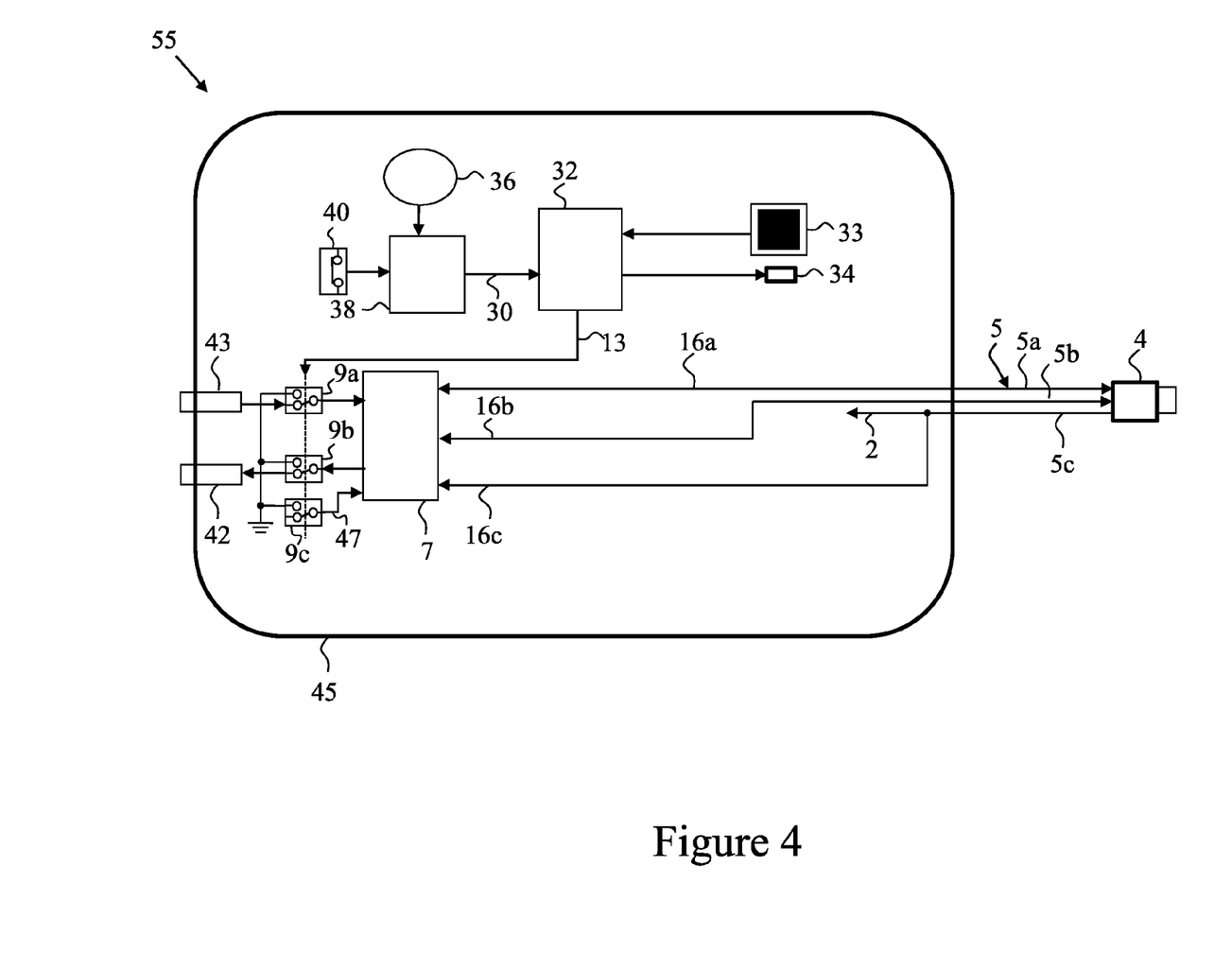
FIG. 4 illustrates a high-level block-diagram of an exemplary method and embodiment of the present invention having an internal audio CODEC function and switched audio inputs/outputs.

It should be noted that method of switching the USB lines shown in this FIG. 4 may be desirable from security standpoint but may have negative operational effects such as—long time delay at each switching due to device re-enumeration and may cause software application problems. The following FIG. 4 uses an alternative method of switching the audio lines and therefore it does not suffer from these potential negative operational effects.

FIG. 4 illustrates a high-level block-diagram of yet another exemplary method and embodiment of the present invention having an internal audio CODEC function and switched audio inputs/outputs.

This embodiment of the present invention 45 is similar to the embodiment 12 described in FIG. 3 above but in this embodiment switches 9a and 9b are positioned between the USB audio CODEC 7 and the audio input jack 43 and output jack 42 respectively. An additional switch 9c may be added to control the USB audio CODEC 7 MIC_MUTE discrete input 47 and thus to enable signaling of the device 45 state to the application running at the coupled computer. For example Voice Over IP application using the secure device 45 may indicate microphone in mute status on the screen whenever the device is in secure state.

This specific implementation of the current invention assures that the USB device would not be enumerated every time that the device changes to operating state.

Figure 5:
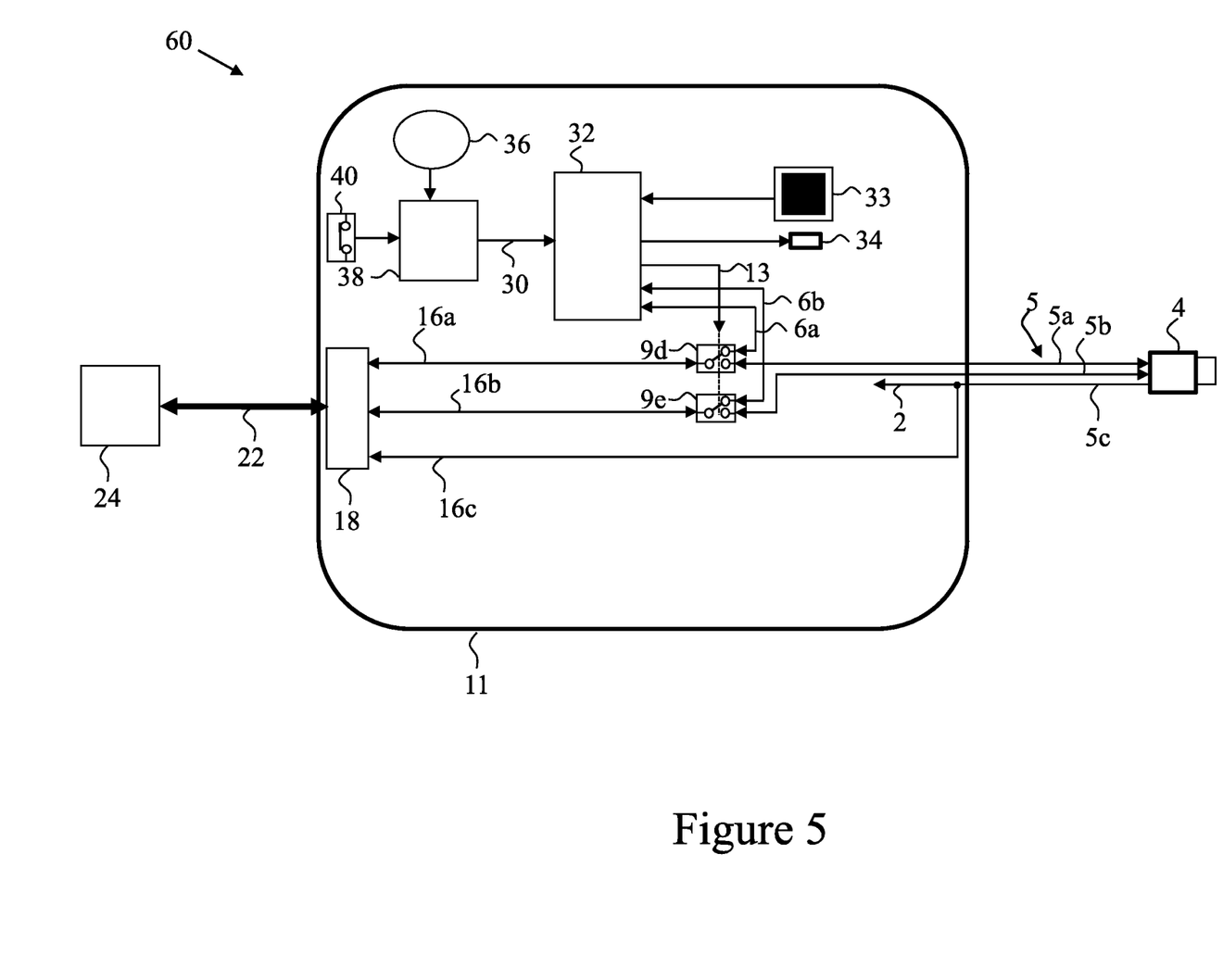
FIG. 5 illustrates a high-level block-diagram of yet another exemplary method and embodiment of the present invention having a prequalification function.

FIG. 5 illustrates a high-level block diagram of yet another secure peripheral device 60 according to yet another exemplary embodiment of the current invention having a USB prequalification function.

This embodiment of the present invention is similar to the embodiment described in FIG. 2 above but in this embodiment the microcontroller 32 is further having USB host function that is coupled to the connected user peripheral device 24 through data lines 16a and 16b. In this embodiment of the current invention before microcontroller 32 switches the 9x to operating state, USB data lines 16a and 16b are switched to the microcontroller 32 through lines 6a and 6b respectively. During device 11 power up or when device 24 first connected, microcontroller 32 enumerates the connected user peripheral device 24 to check if its characteristics are matching the preprogrammed device characteristics. If it is matching—then the device 24 is qualified and may be used (switched to the coupled computer). If it is not qualified—the device 24 cannot be used and proper user indication is given for example through LEDs 34 indicating steady red light. This pre-qualification function assures that only allowed USB devices will be used. A circuitry to detect disconnection and reconnection of user peripheral device may be added to reset the microcontroller 32 when the user change peripheral devices while the device is powered on (connected to the computer). Such detection circuitry may be for example a USB hub as shown in the next figure below.

Operation of elements seen in FIG. 2 is the same as disclosed in the explanation of that figure. Thus, a peripheral device connected to USB jack 18 is activated to a preset time for each depression of push-button 33. Additionally, the user may have clear visual indication as to the state of the device such as: "disconnected"; "qualified"; "disqualified"; "connected"; and "device tempered with". Such secure peripheral device 60 of the current invention may be used to secure existing (prior-art) USB products and therefore to extend their safe use.

Re-enumeration of device 24 by the host is required when switches 9d and 9e connect lines 16a and 16b to 5a and 5b respectively. This causes a delay which may be tolerated.

Optionally, to protect the system against exchanging a valid device 24 with am unauthorized device during the brief time interval of mode change one or both of the following methods may be used:
1. Detection of USB plug mechanical state, using a sensor such as a small switch that is capable of detecting the disconnection of valid device 24 and reporting the disconnection to controller 32 or active anti-tampering function 38
2. USB hub connected between device port 18 and switch 9x. The USB hub reports any device status changes to the controller 32. This option is shown in FIG. 6 below.

Figure 6:
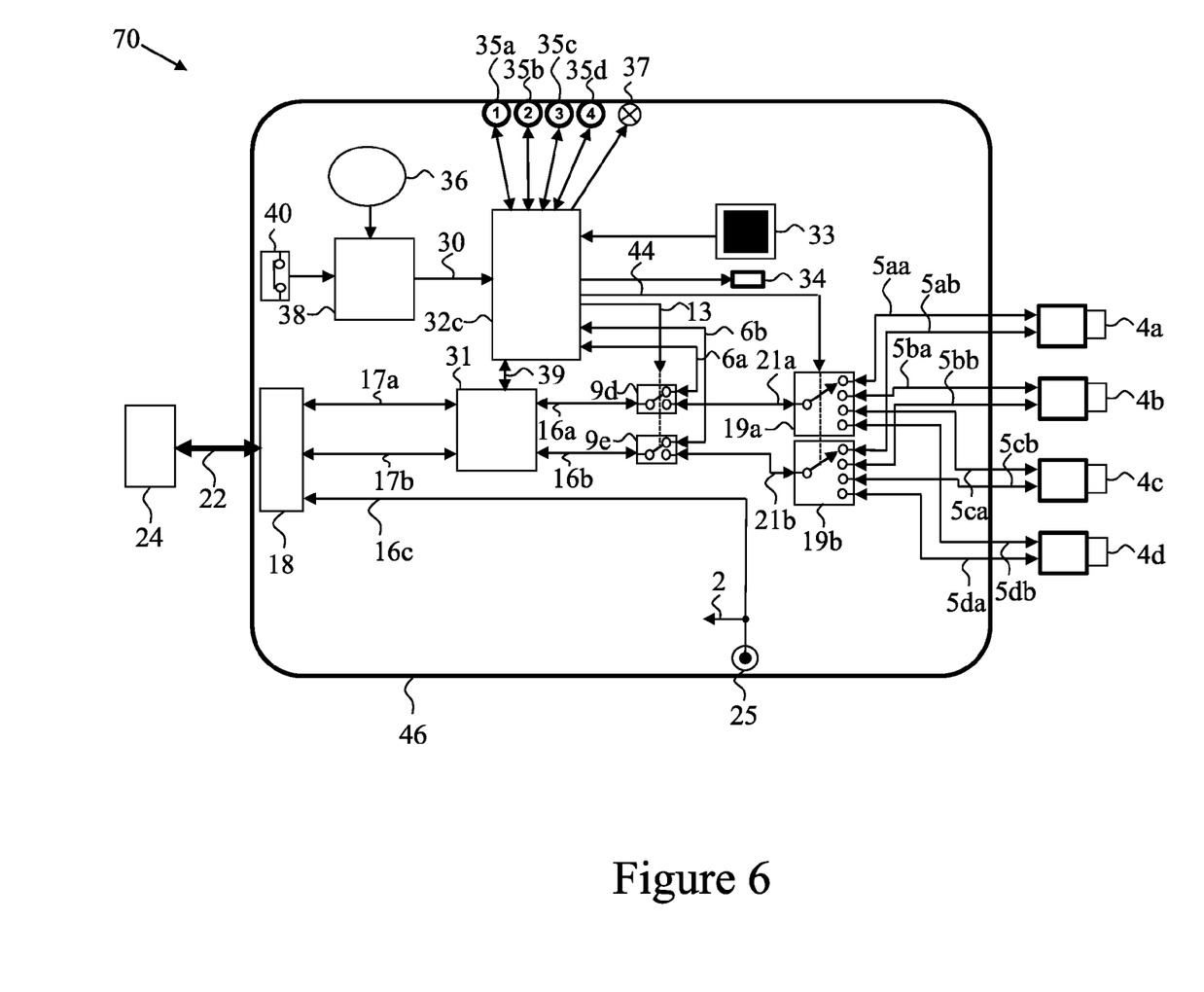
FIG. 6 illustrates a high-level block-diagram of yet another exemplary method and embodiment of the present invention having a prequalification function, USB hub for port monitoring and multiplexer to enable connection to multiple computers.

FIG. 6 illustrates a high-level block diagram of another exemplary method and embodiment of the present invention having a prequalification function, a USB hub for port monitoring and USB multiplexer to enable user selection of connecting to one of multiple computers.

This embodiment of the present invention is similar to the embodiment described in FIG. 5 above but in this embodiment the microcontroller 32c also controls the two USB multiplexers 19a and 19b to select a coupled computer. This device 46 of the present invention is capable of being coupled to a plurality of coupled computers, for example up to 4 different computers through USB plugs 4a to 4d. USB plugs 4a to 4d are coupled through USB wires 5xa and 5xb (x being a, b, c or d) through multiplexers 19a and 19b to USB lines 21a and 21b respectively. The user is capable of selecting at least one of the coupled computers using selector 35. For example—if the user wants to couple the device 24 to a first computer he/she presses push button 35a. Preferably, only one coupled computer may be selected at a given time. Microcontroller 32c commands through line 44 the multiplexers 19a and 19d to switch to the first (upper) position thus coupling lines 5aa and 5ab to lines 21a and 21b respectively. Lines 21a and 21b are coupled to switches 9d and 9e to enable state changes from secure to operating states similar to FIG. 5 above.

This embodiment of the current invention is further comprising a USB HUB 31 that is coupled to the microcontroller 32c through bidirectional channel 39. This enables USB Hub 31 to monitor the device port 18 state and detect and report events such as—device disconnect, device connect, device reset etc. Such information may be essential to detect in order to switch back the connected device 24 to qualification state.

This device 46 of the present invention is optionally further having a DC power jack 25 to connect an external power supply in order to prevent potential power signaling security risks. If one of the USB port power was used to power the device 46 it may cause a severe security threat due to power signaling. In such case it would be possible that one computer will modulate USB power to the device and another computer will sense such changes and translate it into a digital message.

LED indicator 37 provides user indication about the device 46 status. Additional channel selected LEDs may be installed inside or near each channel select push-buttons 35x.

Figure 7:
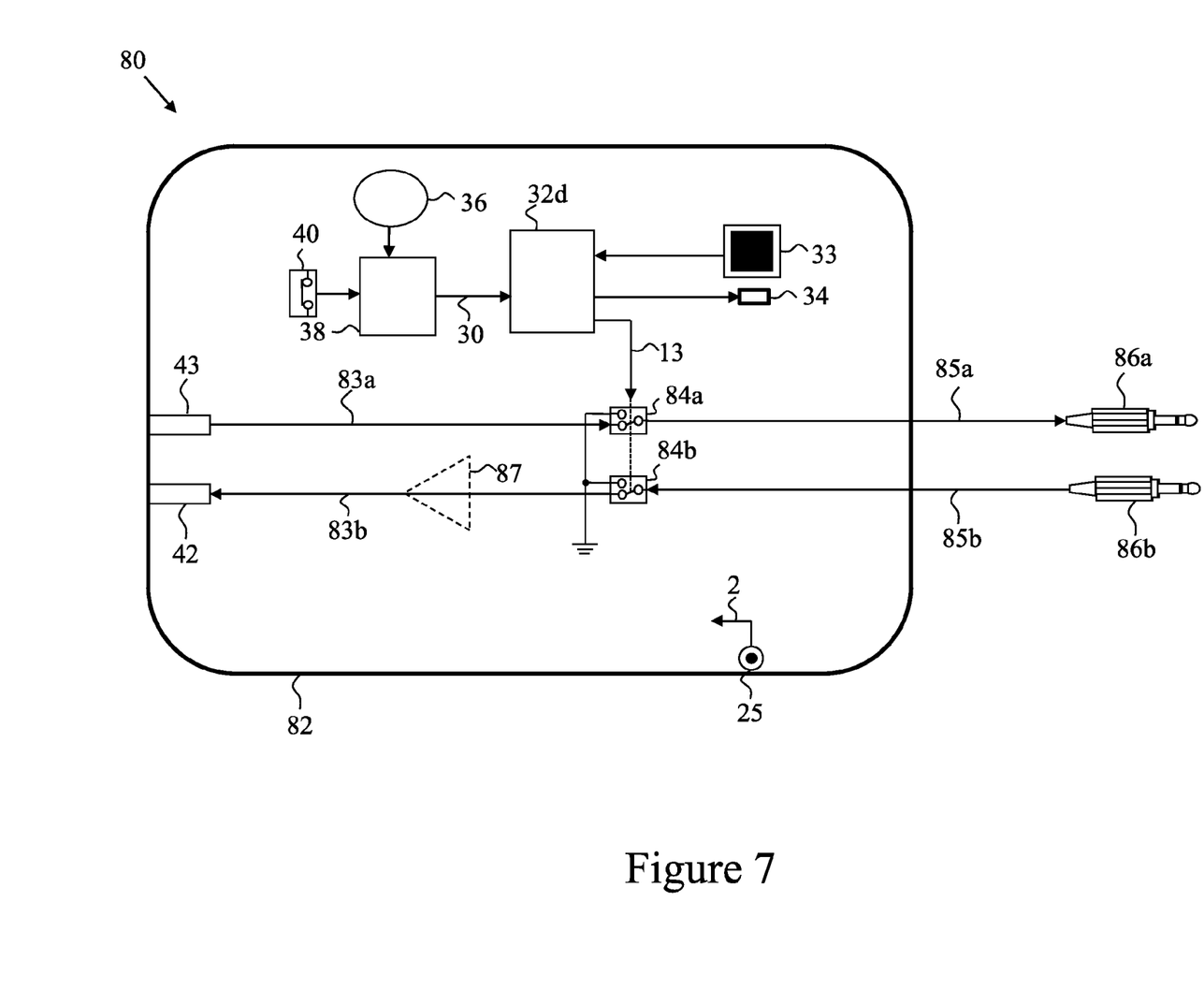
FIG. 7 illustrates a high-level block-diagram of yet another exemplary method and embodiment of the present invention having an analog audio switching function.

FIG. 7 illustrates a high-level block-diagram of yet another exemplary method and embodiment of the present invention similar to the embodiment 45 of FIG. 4 above having an analog audio switching function but not having internal USB audio CODEC 7. This particular implementation of the current invention does not require a USB interface with the coupled computer and therefore may be preferred by customers who don't want to use USB for audio applications.

In this exemplary embodiment of the current invention coupled computer is connected to the device 82 through analog connections such as microphone plug 86a and headphones analog output plug 86b and through shielded cables 85a and 85b respectively. Shielded cables 85a and 85b are coupled to the analog audio switches 84a and 84b respectively that controlled by microcontroller 32d.

When the device 82 is in secure state, microcontroller 32d commands the analog audio switches 84a and 84b to short the microphone input line 85a and headphones output line 86b to the ground and therefore securely disabling both audio inputs and outputs. When the device 82 is in operational state, microcontroller 32d commands the analog audio switches 84a and 84b to connect microphone input line 85a and headphones output line 86b to microphone jack 43 and headphones jack 42 through lines 83a and 83b respectively and therefore enables the audio input and output to the coupled computer.

Optional buffer amplifier 87 may be added on the headphones output line 83b to prevent the option that connected headset would be abused as a dynamic microphone by remote attacker.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A secure peripheral connecting device comprising:
    at least one computer interface, to interface the secure peripheral connecting device with a coupled computer;
    at least one peripheral device interface, to interface the secure peripheral connecting device with a user peripheral device;
    a user switch;
    an indicator element to indicate active mode of the secure peripheral connecting device;
    switches; and
    a controller,
    wherein user activation of said user switch causes said controller to activate said switches for setting the secure peripheral connecting device in an operational state by:
    enabling transfer of data to and from said user peripheral device and said coupled computer; and
    causing said indicator element to indicate an active mode of the secure peripheral connecting device, and
    wherein after a preset time, said controller automatically activates said switches for setting the secure peripheral connecting device in a secured state by:
    disabling transfer of data to and from said user peripheral device and said coupled computer; and
    causing said indicator element to stop indicating the active mode of the secure peripheral connecting device.

2. The secure peripheral connecting device of claim 1, wherein said operational state is maintained as long as said user switch is activated, and the secure peripheral connecting device returns to said secure state after said user switch is released.

3. The secure peripheral connecting device of claim 1, wherein said controller maintains the secure peripheral connecting device in said operational state for a predefined time interval after said user switch is activated.

4. The secure peripheral connecting device of claim 3, wherein, when the secure peripheral connecting device is in said operational state:
    a short activation of said user switch returns the secure peripheral connecting device to said secure state, and
    a long activation of said user switch extends the time interval of said operational state.

5. The secure peripheral connecting device of claim 3, wherein said predefined time interval is adjustable by the user.

6. The secure peripheral connecting device of claim 5, wherein said predefined time interval is adjustable by the user using at least one of: PC programming, keyboard entries, DIP switches, at least one trimmer, a rotary encoder, and configuration resistors.

7. The secure peripheral connecting device of claim 1, wherein said switches are further comprising a switch to disable power to said coupled peripheral device when the secure peripheral connecting device is in said secure state.

8. The secure peripheral connecting device of claim 1, and further comprising an active anti-tampering function.

9. The secure peripheral connecting device of claim 1, wherein, while the secure peripheral connecting device is in said secure state, said switches couple said peripheral device to a controller for prequalification of said peripheral device.

10. The secure peripheral connecting device of claim 9, further comprising a USB hub to monitor the status said peripheral device interface.

11. The secure peripheral connecting device of claim 10, wherein:
    said USB hub detects and reports to the microcontroller at least one event related to said status of said device interface, wherein said at least one event is selected from the group consisting of: peripheral device connection; peripheral device reset; and peripheral device disconnection, and
    wherein said microcontroller controls said USB multiplexers and couples said peripheral device to a controller for prequalification of said peripheral device when said at least one event related to said status of said device interface is detected.

12. The secure peripheral connecting device of claim 1, and further comprising:
    a selector;
    USB multiplexers;
    a plurality of computer interfaces USB plugs, to interface the secure peripheral connecting device with a different coupled computer,
    wherein said selector controls said USB multiplexers to couple a selected coupled computer to said secure peripheral connecting device.

13. A secure peripheral connecting device comprising:
    at least one computer interface to interface the secure peripheral connecting device with a coupled computer;
    at least one USB Audio CODEC;
    at least one analog interfaces to interface the secure peripheral connecting device with a user audio peripheral device;

a user switch;
an indicator element to indicate an active mode of the secure peripheral connecting device;
switches; and
a controller,
wherein user activation of said user switch causes said controller to activate said switches for setting the secure peripheral connecting device in an operational state by:
enabling transfer of data to and from said user peripheral device and said coupled computer; and
causing said indicator element to indicate the active mode of the secure peripheral connecting device, and
wherein said controller after a preset time, automatically activates said switches for setting the secure peripheral connecting device in a secured state by:
disabling transfer of data to and from said user peripheral device and said coupled computer; and
causing said indicator element to stop indicating the active mode of the secure peripheral connecting device.

14. The secure peripheral connecting device of claim 13, wherein said operational state is maintained as long as said user switch is activated, and the secure peripheral connecting device returns to said secure state after said user switch is released.

15. The secure peripheral connecting device of claim 13, wherein said controller maintains the secure peripheral connecting device in said operational state for a predefined time interval after said user switch is activated.

16. The secure peripheral connecting device of claim 15, wherein, when the secure peripheral connecting device is in said operational state:
a short activation of said user switch returns the secure peripheral connecting device to said secure state, and
a long activation of said user switch extends the time interval of said operational state.

17. The secure peripheral connecting device of claim 15, wherein said predefined time interval is adjustable by the user.

18. The secure peripheral connecting device of claim 17, wherein said predefined time interval is adjustable by the user using at least one of: PC programming, keyboard entries, DIP switches, at least one trimmer, a rotary encoder, and configuration resistors.

19. The secure peripheral connecting device of claim 13, wherein said switches comprise a switch to disable power to said coupled peripheral device when the secure peripheral connecting device is in said secure state.

20. The secure peripheral connecting device of claim 13, further comprising an active anti-tampering function.

21. The secure peripheral connecting device of claim 13, and further comprising:
a selector;
USB multiplexers;
a plurality of computer interface USB plugs, each for interfacing the secure peripheral connecting device with a different coupled computer,
wherein said selector controls said USB multiplexers to couple a selected coupled computer to said secure peripheral connecting device.

22. The secure peripheral connecting device of claim 13, wherein when said secure peripheral connecting device is in the secure state, one of said switches shorts at least one of the analog I/O of said at least one USB audio CODEC to ground.

23. The secure peripheral connecting device of claim 13, further comprising a mute switch, controllable by said controller and connected to MIC_MUTE discrete input of said at least one USB audio CODEC,
wherein information indicative of mute status of said at least one USB audio CODEC can be passed to an application running at said coupled computer.

24. The secure peripheral connecting device of claim 13, further comprising a buffer amplifier, for transmitting analog signal only in the direction to said secure peripheral connecting device.

25. A secure peripheral connecting device comprising:
at least one computer interface to interface the secure peripheral connecting device with a coupled computer, wherein said computer interface comprises at least one analog audio connector;
at least one peripheral device interface, to interface the secure peripheral connecting device with a user peripheral device, wherein said peripheral device interface comprises at least one analog audio connector;
a user switch;
an indicator element to indicate an active mode of the secure peripheral connecting device;
switches; and
a controller,
wherein user activation of said user switch causes said controller to activate said switches for setting the secure peripheral connecting device in an operational state by:
enabling transfer signals to and from said user peripheral device and said coupled computer; and
causing said indicator element to indicate the active mode of the secure peripheral connecting device, and
wherein said controller, after a present time, automatically activates said switches for setting the secure peripheral connecting device in a secured state by:
disabling transfer of signals to and from said user peripheral device and said coupled computer; and
causing said indicator element to stop indicating the active mode of the secure peripheral connecting device.

* * * * *